Figure 1:
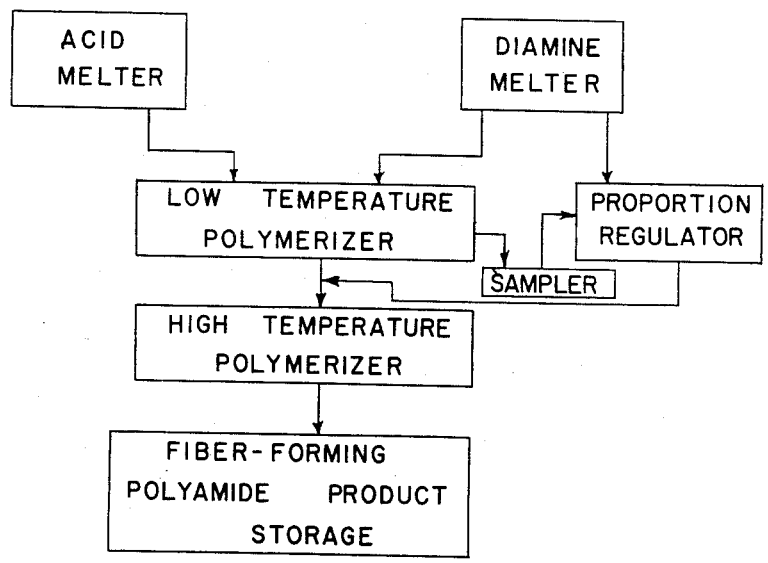

June 24, 1958 W. L. STUMP 2,840,547
PROCESS FOR PREPARING POLYCARBONAMIDES
Filed June 30, 1955 2 Sheets—Sheet 1

INVENTOR
WILLIAM L. STUMP
BY Carl A. Hechmer
ATTORNEY

United States Patent Office 2,840,547
Patented June 24, 1958

2,840,547

PROCESS FOR PREPARING POLYCARBONAMIDES

William L. Stump, Kinston, N. C., assignor to E. I. du Pont de Nemours and Company, Wilmington, Del., a corporation of Delaware Application June 30, 1955, Serial No. 519,065

3 Claims. (Cl. 260—78)

This invention relates to a chemical process. More particularly it is concerned with a process for the preparation of a polyamide.

Various processes useful in the preparation of a fiber-forming polyamide by the polymerization of a dibasic acid with a diamine are illustrated in United States Patent No. 2,130,948, dated September 20, 1938. Thus such materials can be produced by the polymerization of a dibasic acid and a diamine in the presence of an organic solvent. In another technique a precipitated salt of the dibasic acid and the diamine is first formed and after isolation is subjected to polymerization. Formation of the diamine, dibasic acid salt in solution using a pH meter to determine the point of exact equivalency is disclosed in United States Patent No. 2,130,947, dated September 20, 1938. The formation of a diamine, dibasic acid salt in aqueous solution, using a pH meter to determine the point of equivalency, and thereafter polymerizing the salt to the polyamide without intermediate isolation of the salt is taught in United States Patent No. 2,163,584, dated June 27, 1939. Such a procedure, however, requires removal of the water solvent prior to polymerization to high molecular weight. United States Patent No. 2,130,948, previously referred to above, also suggests heating of a mixture of the dibasic acid and the diamine in a closed vessel and removing water formed during the course of the reaction. The latter technique avoids the use of a solvent and its recovery problem and also eliminates the step of forming and isolating the amine acid salt prior to polymerization. However, the direct polymerization of dibasic acid and diamine poses several problems. For instance, one material melts before the other and due to difficulties in heat transfer, polymerization tends to begin spottily throughout the reaction mass, leading to poor uniformity of product. This can be cured to some extent by agitation. However, even the introduction of an agitator produces its own heat transfer problem in the loss of heat through the stirrer itself. Another problem faced in the direct polymerization of dibasic acid and diamine is their regulation in exactly the desired molecular proportions. The use of one or the other reactant in more than slight excess over the exactly desired ratio results in variation of molecular weight from batch to batch or with time in a continuous process. Further when the one or the other reactant is present in more than slight excess the result is a product of low molecular weight, frequently below that necessary to produce a fiber-forming polymer. Furthermore, subjecting adipic acid to conventional polymerization temperatures leads to cyclization as a competing reaction which not only greatly reduces the yield of product but also aggravates the problem of maintaining the desired exact molecular proportions of reactants essential to the production of a high molecular weight, fiber-forming polymer of essentially unvarying average molecular weight. The volatility of the diamines at melt polymerizing temperatures is a further factor which renders the maintenance of desired reactant proportions difficult in the melted condition.

It is an object of the present invention to provide a process for the preparation of a polyamide directly from a diamine and a dicarboxylic acid.

Another object is to provide a method of controlling the mixing of essentially exact equimolecular proportions of a diamine and a dicarboxylic acid in the preparation of a fiber-forming polyamide by melt polymerization.

These and other objects will become apparent in the course of the following specification and claims.

In accordance with the present invention a fiber-forming polyamide is produced by blending in approximately equimolecular proportions the melts of a diamine and a dicarboxylic acid at a temperature just sufficient to maintain the mixture in molten form, adjusting the proportion of the said diamine and the said dicarboxylic acid accurately to the desired molecular proportions and thereafter polymerizing the mixture to the fiber-forming stage.

The invention will be more readily understood by reference to the drawings.

Figure 1 is a flow sheet for the process. As shown in the figure the diamine and the dicarboxylic acid are each melted in separate units. Approximately equimolecular proportions of the respective melts are then blended together in a low temperature polymerizer operating with a slight excess of the higher melting intermediate. The temperature applied to the blend is low enough to avoid too rapid polymerization so that the average molecular weight of the polymer is kept sufficiently low to have a large fraction of product still water soluble but high enough to maintain the mixture in the molten form. At this stage of the reaction the diamine and dicarboxylic acid proportion is adjusted accurately to the desired molecular ratio. Subsequent to proportion regulation the reaction mass is subjected to a high temperature polymerization which proceeds with elimination of water of reaction according to conventional techniques until the molecular weight increases to the fiber-forming stage.

Figure 2:
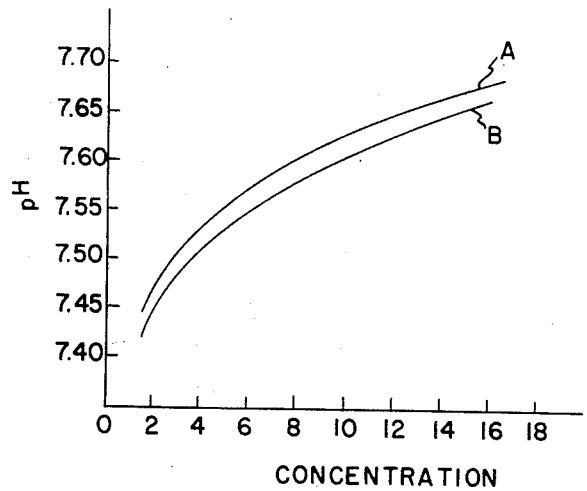

Figure 2 illustrates a pair of curves useful in the proportion regulation when it is desired to have the proportions in essentially exact equimolecular ratio. The curve plots pH as the ordinate against concentration as the abscissa. In accordance with the invention a sample is withdrawn from the low temperature polymerizer after a pre-determined period of polymerization. The sample is thereafter dissolved in a liquid and the pH of the solution is observed. Knowing the concentration of the low molecular weight polymer in the liquid, reference is made to the curve to determine the pH associated with essentially exact equimolecular proportions of diamine and dicarboxylic acid at the particular concentration. The pH of a solution of a balanced low molecular weight polymer is essentially the same as that of an equimolar concentration of the original balanced salt. The difference between the pH observed and the pH of essentially exact equimolecular proportions is noted and applied to the ecurve of Figure 3 to determine the adjustment required to obtain the desired esentially exact equimolecular proportions.

Figure 3:
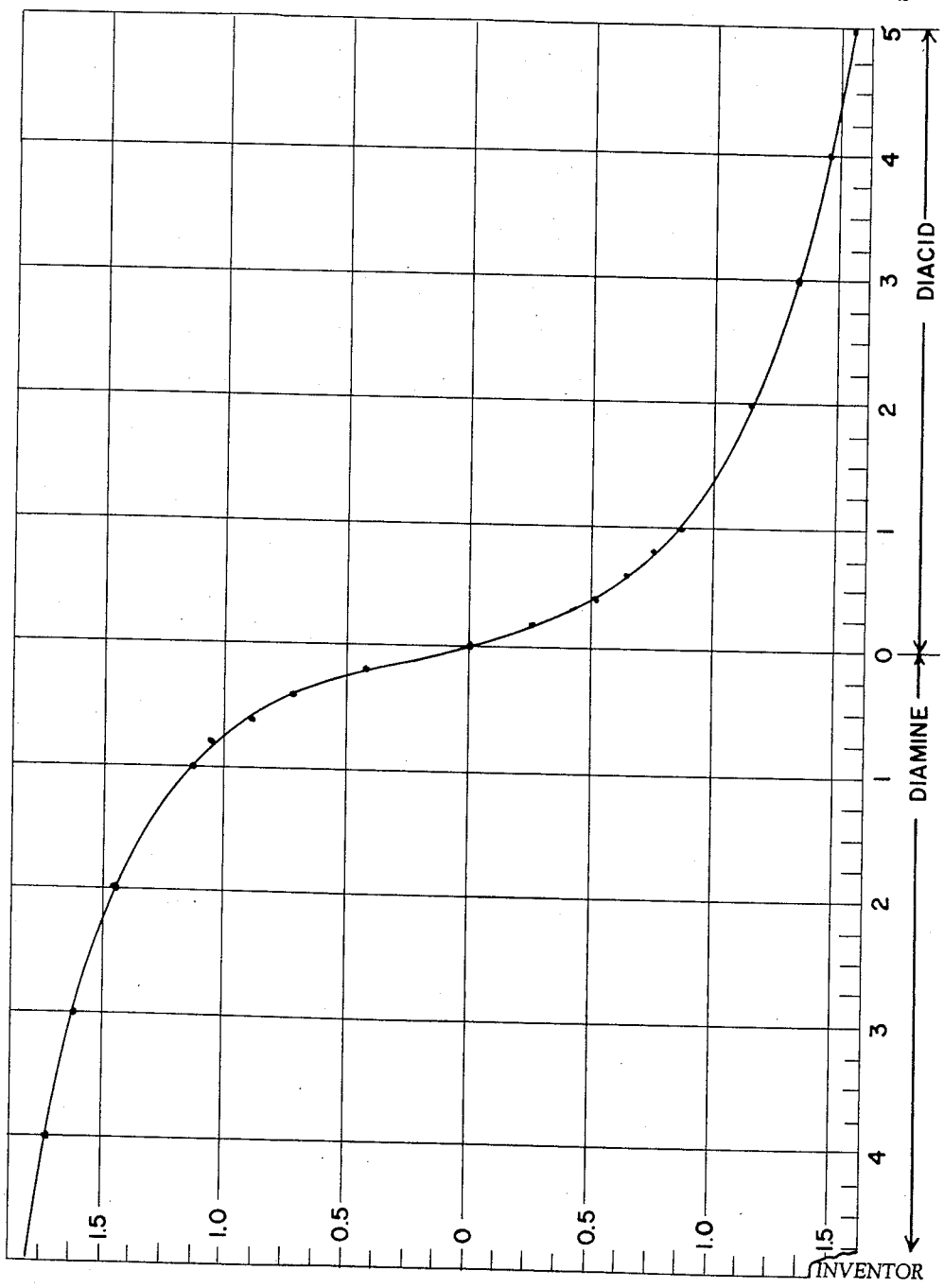

Figure 3 is a plot of the change in pH of an aqueous solution containing 9.5% by weight of a low molecular weight polyamide as ordinate against the mole percentage of excess aliphatic diamine and excess aliphatic diacid as abscissa. Having determined the difference between the pH observed and the pH of essentially exact equimolecular proportions from the curve of Figure 2, this difference is applied to the ordinate of the curve of Figure 3 and the amount of diacid or diamine in excess is read off. The appropriate quantity of the low constituent is then added to establish the desired essentially exact equimolecular proportions.

Examples I, II, and III are drawn to the preparation of polyamides wherein the diamine and diacid constituents are in exact equivalence to illustrate the preferred embodiment of the invention. They are not intended to limit the invention since obviously by employing the same principles, polyamides can be made wherein the diamine-diacid proportion is accurately controlled at any desired value. This is shown in Example IV.

*Example I*

Approximately equimolecular proportions of molten hexamethylenediamine (50° C.) and molten adipic acid (160° C.) are blended in a closed stainless steel vessel capable of withstanding pressures greater than 250 p. s. i. g. The heat of salt formation raises the temperature of the mixture to 200° C. The mixture is held at this temperature for 4 minutes. A sample of the low molecular weight product formed (having a water solubility of 62%) is added to sufficient water to make a mixture containing 9.5% solids. The pH of the water-polymer mixture, having a concentration of 5.9% dissolved polymer (62% × 9.5%), is observed to be 7.30. Reference to curve A of Figure 2 shows the pH for an aqueous solution containing 5.9% of the polymer prepared from exact equimolecular proportions to be 7.58 The difference between the desired pH and the observed pH being 0.28 (7.58−7.30), and on the acid side, a reference to the curve of Figure 3 shows such a difference to correspond to an excess of 0.22 mole percentage of diacid. To establish essentially equimolecular proportions therefore 0.22 mole percentage of hexamethylenediamine is added. The temperature of the reactants is then increased gradually until the pressure reaches 250 pounds per square inch (gauge). Thereafter steam is bled from the reactor while the temperature is increased to 275° C. The polymer is held for one hour at atmospheric pressure and 275° C. under nitrogen. The product is then quenched. It has an average molecular weight of 17,000.

*Example II*

Approximately equimolecular proportions of molten hexamethylenediamine (50° C.) and molten sebacic acid (145° C.) are blended in a closed stainless steel vessel. The heat of salt formation raises the temperature of the mixture to 190° C. The mixture is held at this temperature for 4 minutes. The sample of the low molecular weight product formed (having a water solubility of 70%) is added to sufficient water to make a mixture containing 9.5% solids. The pH of the water to polymer mixture, having a concentration of 6.65% dissolved polymer (70% × 9.5%) is observed to be 7.45. Curve B is applicable to this system. The lowered position of Curve B results from the greater number of methylene groups per functional group so that for a given weight concentration, the molar concentration of functional groups is somewhat lowered. Reference to the curve shows the pH for the aqueous solution containing 6.65% of the polymer prepared from essentially exact equimolecular proportions to be 7.55. The amount of hexamethylenediamine in the low molecular weight polymerizer is therefore increased by .080 mole percentage as is indicated necessary by reference to the curve of Figure 3. The polymerization cycle is then continued to the fiber-forming stage as taught in Example I. The product has an average molecular weight of 19,000.

*Example III*

Approximately equimolecular proportions of molten pentamethylenediamine (25° C.) and molten adipic acid (160° C.) are blended in a closed stainless steel vessel. The heat of salt formation raises the temperature of the mixture to 175° C. The mixture is held at this temperature for 4 minutes. The sample of the low molecular weight product formed (having a water solubility of 90%) is added to sufficient water to make a mixture containing 9.5% solids. The pH of the water-polymer mixture, having a concentration of 8.6% dissolved polymer (90% × 9.5%) is observed to be 7.20. Although curve A of Figure 1 does not represent exactly the relationship of concentration of low molecular weight polymer in water vs. pH for this polyamide, it does give a closely approximate value since the diacid is the same and since the diamine differs by only one methylene group. Referring to this curve the concentration of 8.6 corresponds to a pH of 7.59 at the point of equimolecular proportions. Referring these values to the curve of Figure 3, 0.31 mole percentage of pentamethylenediamine is added to establish essentially equimolecular proportions. Polymerization to fiber-forming molecular weight is accomplished under substantially the same conditions as employed in Example I, the heating at atmospheric pressure being performed at 260° C. instead of 275° C.

*Example IV*

This example demonstrates the maintenance of an exact molecular proportion between the diamine and diacid of Example I, wherein the diamine is kept accurately at a level of 1.0 mole percent in excess.

Molten hexamethylenediamine and molten adipic acid with diamine at 1.0 mole percent excess are blended in the vessel of Example I. The heat of salt formation raises the temperature of the mixture to 200° C. The mixture is held at this temperature for 4 minutes. A sample of the low molecular weight product formed (having a water solubility of 70%) is added to sufficient water to make a mixture containing 9.5% solids. The pH of the water-polymer mixture, having a concentration of 6.7% dissolved polymer (70% × 9.5%), is observed to be 8.40. Reference to curve A of Figure 1 shows the pH for an aqueous solution containing 6.7% of the polymer prepared from exactly equimolecular proportions to be 7.59. Since it is desired to maintain a 1.0 mole percent excess diamine, the control pH point is shown in the curve of Figure 3 to be 1.12 above the pH of exact equimolecular proportions. Hence the amount of hexamethylenediamine is increased by 0.62 mole percent to bring the pH of the mixture to 8.71 (7.59 × 1.12). The conditions of Example I are then continued to get a polymer having an average molecular weight of 12,000.

As demonstrated in the examples and as shown in Figures 2 and 3, the process of the present invention consists of four steps, namely:

(1) Blending of the melts of the diamine and dicarboxylic acid;

(2) Production of a low molecular weight polymer by maintaining the blend in a melted form for a predetermined period of time;

(3) Adjusting accurately the quantities of diamine and dicarboxylic acid to the desired molecular proportions;

(4) Polymerization of the proportion-adjusted low molecular weight material to the fiber-forming stage by conventional melt polymerization techniques.

The combination of reactants by blending of their respective melts permits their uniform mixing. Such technique avoids spot polymerization which necessarily occurs when an attempt is made to melt the solid admixture, since one material melts prior to the other. The technique of blending the melts also permits utilization of the heat of salt formation which brings the temperature of the mixed components to the melting point of the salt which forms upon mixing. The invention is broadly applicable to the preparation of polyamides by the reactions of diamines and dicarboxylic acids. A valuable class of reactants are diamines of the formula $NH_2$—R—$NH_2$ and dicarboxylic acids of the formula HOOC—R′—COOH in which R and R′ are divalent hydrocarbon radicals free from aliphatic unsaturation and in which each of R and R′ has a chain length of at least two carbon atoms. Especially useful reactants within this group are those in which R is $(CH_2)_x$ and R′ is $(CH_2)_y$ where $x$ is at least 4 and $y$ is at least 3. Among the polyamides which may be produced by the process may be mentioned polytetramethylene adipamide, polytetramethylene suberamide, polytetramethylene sebacamide, polypentamethylene adipamide, polypentamethylene sebacamide, polyhexamethylene adipamide, polyhexamethylene sebacamide, polyoctamethylene adipamide, polydecamethylene adipamide, polytetramethyleneterephthalamide, polyhexamethyleneterephthalamide, copolymers of the above, and the like.

In forming the low molecular weight polymer, the melted blend is held at a temperature below that at which rapid polymerization of the dicarboxylic acid occurs for a predetermined period of time. The temperature is maintained below the temperature at which substantial volatilization of the diamine component occurs and below diacid cyclization temperatures where such occurs as in the case of adipic and similar acids. The time factor is related to the water solubility of the low molecular weight material. If polymerization proceeds too far, this intermediate product is too insoluble in water to permit relating of the pH of its aqueous solution to the presence of proportional amounts of reactants. To determine the optimum period of low temperature polymerization a curve for any system can be determined by plotting the time of polymerization vs. solubility. It will be obvious that solubility of product in water will decrease as the polymerization period is increased for any particular set of reactants at any particular polymerization temperature. The formation of the low molecular weight intermediate polymer not only provides a means of proportion regulation but it also tends to complete salt formation and to initiate polymerization slowly, thereby tying up dicarboxylic acid, preventing its cyclization, and tying up diamine, preventing its volatilization on further high temperature melt polymerization.

Having formed the low molecular weight intermediate polymer, a small sample is employed to determine the amount of regulation necessary in the polymerizer to attain essentially exactly the desired molecular proportions. Generally when the polymerization has proceeded for not more than about 6 minutes, at a temperature just sufficient to maintain the mixture in the melted form, the pH of a particular concentration of the low molecular weight polymer in water produced from equimolecular proportions will be the same as the pH of the aqueous solution of the salt of the same diamine and dicarboxylic acid present in equivalent amounts at the same concentration. Thus by taking a sample of a salt and measuring the pH of its aqueous solution at various concentrations, a curve can be drawn of pH vs. concentration. It has been observed that for aliphatic acids and amines these curves are very similar for salts containing approximately the same number of carbon atoms. Thus in Figure 1, curve A represents a plot of pH vs. concentration for a salt containing 10 methylene groups. Curve B represents a similar plot for a salt containing 14 methylene groups. Obviously other curves may be developed to fit other polyamides.

In general it is desirable that the molten mixture be maintained for at least about 2 minutes before withdrawal of the sample for pH determination. This permits intimate mixing. A period of from about 3 to about 5 minutes is preferred. As previously mentioned, the temperature of this molten mixture should be no higher than that required to maintain it in molten form. For acids having from about 5 to about 8 carbon atoms temperatures above about 210° C. should be avoided. Knowing the time of polymerization in the low temperature polymerizer, and therefore the water solubility of the product, reference can be had to the pH vs. concentration curve previously referred to, to determine the proper pH representing essentially exact equimolecular proportions at the particular concentration. By "essentially exact equimolecular proportions" is meant that neither component exceeds equal molar proportions by more than about 0.5 mole percentage. As previously described the reactants are already in approximate equimolecular proportions during the low temperature polymerization, i. e., one component should not exceed the other by more than about 3 mole percentage.

Figure 3 describes how the pH of a 9.5% solution of nylon salt from aliphatic diamine and aliphatic dicarboxylic acid is effected by excess diamine or diacid. The addition of amine will cause the pH to rise. Addition of acid may be employed to lower the pH. It is preferred to operate the low temperature polymerizer with a slight excess of acid making the correction at each time with diamine since the diamine is generally the lower melting component and this is easier to handle in the proportion regulator.

Polymerization of the low molecular weight product to one of fiber-forming characteristics proceeds according to conventional polyamide melt polymerization techniques. In general, this involves increasing the temperature of the melt sufficient to maintain it in the molten form as its viscosity increases and removing water of reaction. Usually a temperature between about 250° and 290° C. is employed. The point at which fiber-forming product is obtained is that point at which a fiber is produced when stirring rod is withdrawn from the surface of the melt after contact herewith. This usually corresponds to an intrinsic viscosity of about 0.3. During the high temperature polymerization it is necessary to exclude oxygen from the surface of the reaction mass.

In any particular system, knowing the constants involved, it will be obvious that the process may be rendered automatic and continuous employing conventional equipment. For instance, operating with an excess of dicarboxylic acid, additional diamine may be added automatically downstream of the low temperature polymerizer through a pump whose rate is controlled by a General Electric Thymotrol motor speed controller whose potentiometer is coupled with the recorder pen of a Leeds and Northrup pH recorder which may be employed to measure the pH of the sample removed from the low temperature polymerizer. After correction to the desired exact molecular proportions the low molecular weight material is fed to a high temperature melt polymerizer or if desired the correcting amount of diamine may be added to the high temperature polymerizer. Obviously the system can be operated with an excess of diamine so that the control operates to change automatically the amount of additional diacid added. Further the system can be operated with controls on auxiliary streams of both diamine and diacid if the method of feeding the gross streams to the low temperature polymerizer operates to give first one and then the other in excess over the desired control point.

The best prior art method for control of the molecular ratio of the reactants in polymerizing continuously a melt of a diamine and a diacid can do no better than ±.3 mole percent deviation from the control point. The method of this invention permits control down to ±0.03 mole percent or better.

The process of the present invention is useful in the production of high molecular weight polyamides from dicarboxylic acids and diamines. Such materials may be employed to manufacture shaped structures such as yarns, filaments, staple, pellicles and the like.

Many equivalent modifications will be apparent to those skilled in the art from a reading of the above without a departure from the inventive concept.

What is claimed is:

1. A process for the preparation of a synthetic, linear, fiber-forming polycarbonamide in which the recurring carbonamide linkages are an integral part of the polymer chain, which comprises blending the separately prepared melts of a diamine, the nitrogens of which are substituted with active hydrogen, and a dicarboxylic acid, both of which blend components melt above room temperature, in such proportion that neither component exceeds the other by more than about 3 mole percentage, maintaining the blend in molten form to produce a low molecular weight polymer partially soluble in water, and thereafter adjusting the proportion of the said diamine to the said dicarboxylic acid by addition of one of the said components so that the pH of an aqueous solution of the said low molecular weight polymer has a predetermined value, and such that the composition of the said low molecular weight polymer and the said added component is suitable for the preparation of a linear, fiber-forming polycarbonamide, and thereafter melt polymerizing the low molecular weight polymer to the fiber-forming stage.

2. The process of claim 1 wherein the low molecular weight polymer is prepared at a temperature no greater than about 210° C. by heating the polymer melt for no more than about 6 minutes.

3. The process of claim 2 wherein the said diamine is hexamethylene diamine and the said dicarboxylic acid is adipic acid.

References Cited in the file of this patent

UNITED STATES PATENTS

| | | |
|---|---|---|
| 2,163,584 | Carothers et al. | June 27, 1939 |
| 2,172,374 | Flory | Sept. 12, 1939 |

FOREIGN PATENTS

| | | |
|---|---|---|
| 526,488 | Belgium | Feb. 27, 1954 |

OTHER REFERENCES

A. P. C. application of Friederich et al., Serial No. 309,376, published April 20, 1943 (now abandoned).